(12) United States Patent
Hsueh

(10) Patent No.: US 7,422,226 B2
(45) Date of Patent: Sep. 9, 2008

(54) ANTI-SWAY TRAILER HITCH

(76) Inventor: Paul Y J Hsueh, 4790 Myrtle Dr., Concord, CA (US) 94521

( * ) Notice: Subject to any disclaimer, the term of this patent is extended or adjusted under 35 U.S.C. 154(b) by 115 days.

(21) Appl. No.: 11/424,237

(22) Filed: Jun. 15, 2006

(65) Prior Publication Data

US 2007/0210558 A1      Sep. 13, 2007

Related U.S. Application Data

(63) Continuation-in-part of application No. 10/908,672, filed on May 23, 2005, now Pat. No. 7,137,643.

(51) Int. Cl.
*B60D 1/32* (2006.01)
(52) U.S. Cl. .................. 280/455.1; 280/497; 280/461.1
(58) Field of Classification Search .............. 280/455.1, 280/497, 461.1, 446.1, 456.1, 492
See application file for complete search history.

(56) References Cited

U.S. PATENT DOCUMENTS

| | | | | | |
|---|---|---|---|---|---|
| 4,949,987 | A | * | 8/1990 | Gallatin | ....................... 280/459 |
| 5,335,856 | A | * | 8/1994 | Nathan | ........................ 239/164 |
| 6,485,046 | B1 | * | 11/2002 | Hsueh et al. | .............. 280/455.1 |
| 7,137,643 | B1 | * | 11/2006 | Hsueh | ...................... 280/455.1 |

* cited by examiner

*Primary Examiner*—Lesley D. Morris
*Assistant Examiner*—Maurice Williams

(57) ABSTRACT

An anti-sway trailer hitch connection is provided for use between a towing vehicle and a trailer and includes structure whereby slight left and right lateral movement of the forward end of the towing vehicle will not be translated into right and left lateral movement, respectively, of the forward end of the trailer, and thereby eliminates the tendency of a trailer to sway back and forth while a towing vehicle changes lanes on a highway or is acted on by cross-wind gusts from the passing of a large vehicle.

5 Claims, 15 Drawing Sheets

ANTI-SWAY TRAILER HITCH

CROSS-REFERENCE TO RELATED APPLICATIONS

The present application is a continuation-in-part of U.S. application Ser. No. 10/908,672 filed May 23, 2005 now U.S. Pat. No. 7,137,643, entitled "Anti-sway Trailer Hitch", which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to trailer hitches, and more particularly to an improved anti-sway trailer hitch.

BACKGROUND INFORMATION AND DISCUSSION OF RELATED ART

Inasmuch as most passenger vehicles and the like include rear overhang portions, which project considerably rearward of the rear wheels of the vehicle, and trailer hitches are constructed in a manner such that the forward tongue portion of a trailer towed behind such vehicles are actually coupled to the vehicles at a point spaced slightly rearward of the rear bumpers of the vehicles, any slight left and right lateral shifting of the forward end of the towing vehicle results in right and left lateral shifting, respectively, of the forward end of the trailer.

This operational feature of the combination of a passenger vehicle and a trailer being towed there behind can be very dangerous, especially when the vehicles are moving at highway speed, such that the vehicles are having momentums such that a sudden lateral changing of direction of the towing vehicle can cause a serious swaying problem of the trailer.

Because the towing vehicle rearward end displaces to the side that is opposite to its forward end, it is especially dangerous when vehicles are in a down hill situation such that the weight of the trailer adds to the momentum of the trailer and the trailer has the tendency to push the towing vehicle rearward end off the moving course.

The towed vehicle-swaying problem is also pronounced when the towed vehicle has a large side elevation area upon which crosswind gusts and slip stream blasts may act on the towed vehicle for creating a sudden unstable condition.

Accordingly, a need exists for a hitch connection between a vehicle and a trailer that eliminates the swaying tendencies of the vehicle and trailer combination as a result of slight lateral shifting of the forward end of the towing vehicle.

Various solutions to the problem of trailer swaying have been proposed with anti-sway trailer hitches that include at least some of the general structural and operational features of the instant invention are disclosed in U.S. Pat. Nos. 2,201,660, 2,913,256, 3,254,905, 3,785,680, 3,787,077 and 3,825,282.

The most closely related improvement in anti-sway trailer hitch assemblies was disclosed in U.S. Pat. No. 6,485,046, by the present inventor. But, the '046 patent hitch assembly has a limitation for limiting the towing vehicle turning angle, such that, at a larger turning angle, the control rod that connects the hitch beam to the control beam will move closer to and interfere with the intermediate bar on the hitch assembly, thus limiting the towing vehicle turning angles.

SUMMARY OF THE INVENTION

An anti-sway trailer-hitch assembly for connecting a towing vehicle to a towed vehicle having symmetrical anti-sway features.

The vast majority of passenger vehicles include a substantial vehicle mass that projects rearward from the back wheels of the vehicle. With a conventional trailer hitch installed on the rearward end of the towing vehicle, a slight left and right lateral shifting of the forward end of the towing vehicle results in concomitant right and left lateral shifting of the connecting towed vehicle forward end.

With the present anti-sway trailer hitch invention installed on the rearward end of the towing vehicle, a slight left and right lateral shifting of the forward end of the towing vehicle will result in a concomitant lateral shifting left and right, respectively, of a hitch ball affixed to a hitch beam on the anti-sway trailer hitch.

The hitch ball lateral left and right shifting displacements cancel out the towing vehicle rearward end lateral right and left shifting displacements respectively, so that the hitch ball remains at the same location and does not shift laterally.

With the towed vehicle forward end connected to the hitch ball, the towed vehicle forward end does not shift laterally when the towing vehicle forward end shifts laterally, and thus the towed vehicle remains stable and does not sway.

DETAILED DESCRIPTION OF THE INVENTION

Figure 1:
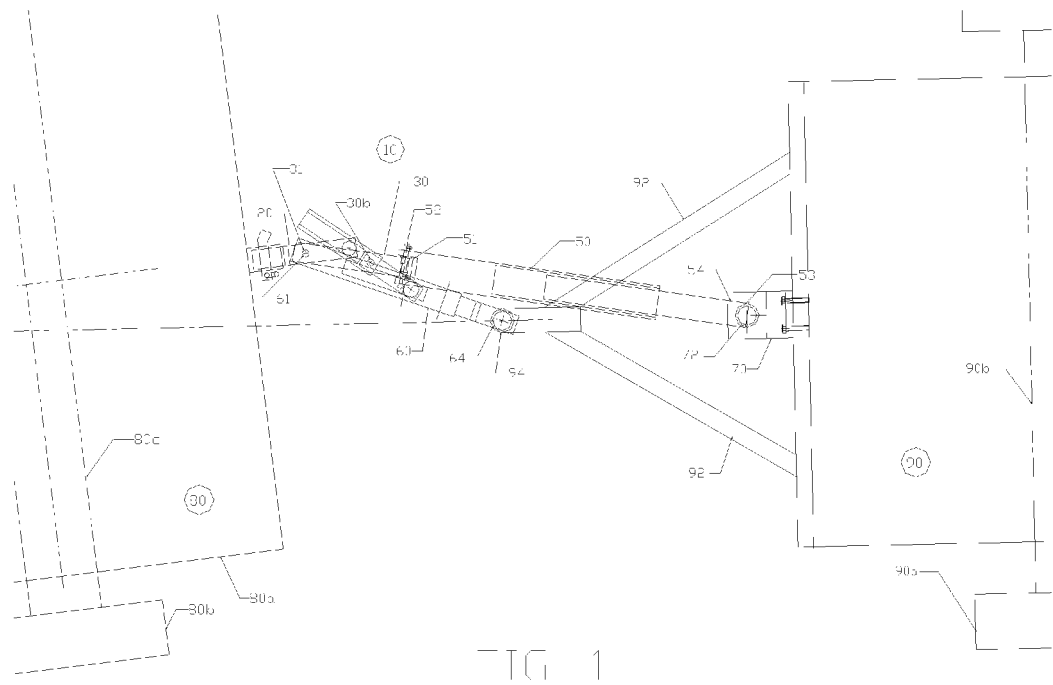
FIG. 1 is a plan view of the trailer hitch according to the present invention of connecting a towed vehicle in the form of a trailer to a towing vehicle.
Figure 2:
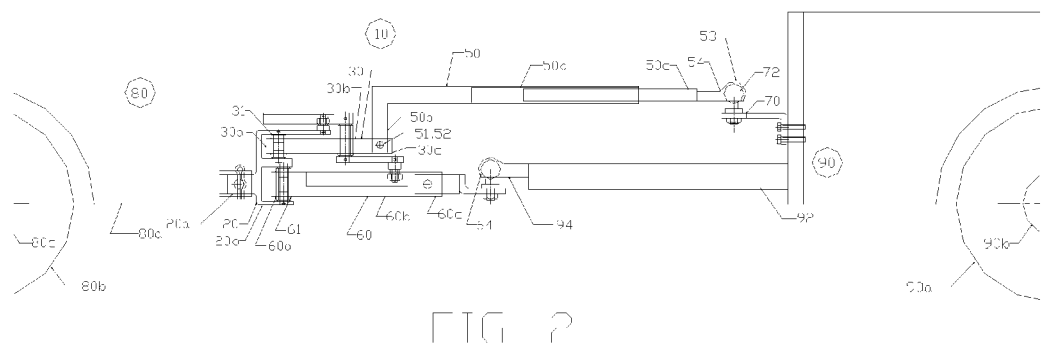
FIG. 2 is a side view of the trailer hitch according to the present invention of connecting the trailer to the towing vehicle.

As illustrated in FIG. 1 and FIG. 2, A hitch assembly of the present invention is generally designated by reference numeral 10 and articulately connects a towing vehicle 80 and a towed vehicle 90. The towing vehicle 80 includes a frame 80a, rear wheels 80b and rear axle 80c. The towed vehicle 90 is in the form of a trailer having supporting wheels 90a at opposite ends of an axle 90b. Various supporting wheel and axle arrangements may be provided for the trailer 90, and the forward end of the trailer is provided with a tongue or frame structure 92 that extends forward and includes a trailer hitch coupler 94 at forward end thereof.

The hitch assembly 10 includes a hitch frame 20 having a forward end 20a and a rearward end 20b, a center beam 30 having a forward end 30a, a middle portion 30b and a rearward end 30c, a center beam-extension 50 having a forward end 50a, a middle portion 50b and a rearward end 50c, a hitch beam 60 having a forward end 60a, a middle portion 60b and a rearward end 60c, and a rear support 70.

Hitch frame 20 forward end 20a installs onto towing vehicle 80 rearward-end.

Center beam 30 forward end 30a is pivotally connecting to hitch frame 20 rearward-end 20b through a pivotal connection 31. Pivotal connection 31 allows center beam 30 to swing an arc horizontally around pivotal connection 31.

Hitch beam 60 forward end 60a is pivotally connecting to hitch frame 20 rearward-end 20b through a pivotal connection 61. Pivotal connection 61 allows hitch beam 60 to swing an arc horizontally around pivotal connection 61.

Center beam 30 rearward end 30c is pivotally connecting to center beam-extension 50 forward end 50a by a pivotal connection 51, which includes a removable pin 52. Pivotal connection 51 allows center beam-extension 50 swings an arc vertically around pivotal connection 51.

Center beam-extension 50 rearward end 50c is pivotally connecting to rear support 70 upper-end by a pivotal connection 53. Pivotal connection 53 includes a hitch coupler 54 affixing on center beam-extension 50 rearward end 50c and a hitch ball 72 affixing on rear support 70 upper end. Hitch coupler 54 engages with hitch ball 72.

The rear support 70 lower-end is affixed firmly to trailer 90 body and frame 92.

The center beam-extension 50 mid portion 50b is hollow inside such that the rearward end 50c forward section is able to slide inside mid portion 50b. This sliding feature together with pivotal connections 51 and 53 compensates for the constantly-changing distances between the two vehicles due to road conditions and vehicle turning. Besides, this sliding feature can further accommodate different trailers being towed because trailer frame 92 varies in lengths for different trailers.

Hitch beam 60 rearward end 60c including a hitch ball 64 is engaged by hitch coupler 94 affixed to the towed vehicle 90 forward end.

When connecting the towed vehicle to the towing vehicle by connecting trailer hitch coupler 94 to hitch ball 64, to make the connection easier, it is better first to remove the center beam-extension 50 completely so that it will be out of the way. For this reason, pin 52 can be removed from pivotal connection 51 on center beam-extension 50 forward end, and hitch coupler 54 can be disengaged from hitch ball 72 on rear support 70, so that center beam extension 50 can be removed completely.

Figure 3:
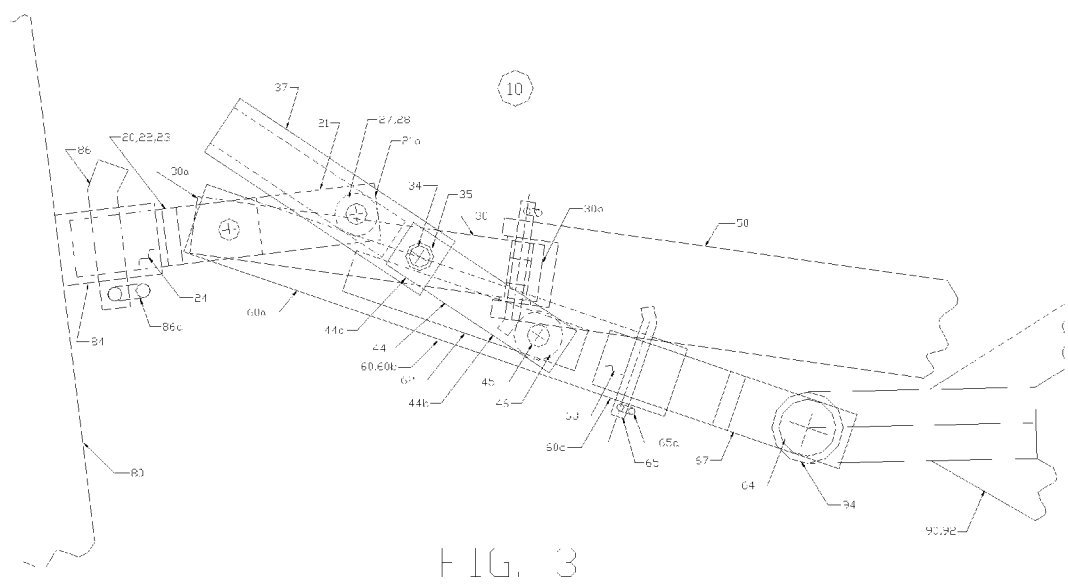
FIG. 3 is an enlarged plan view of the trailer hitch according to the present invention.
Figure 4:
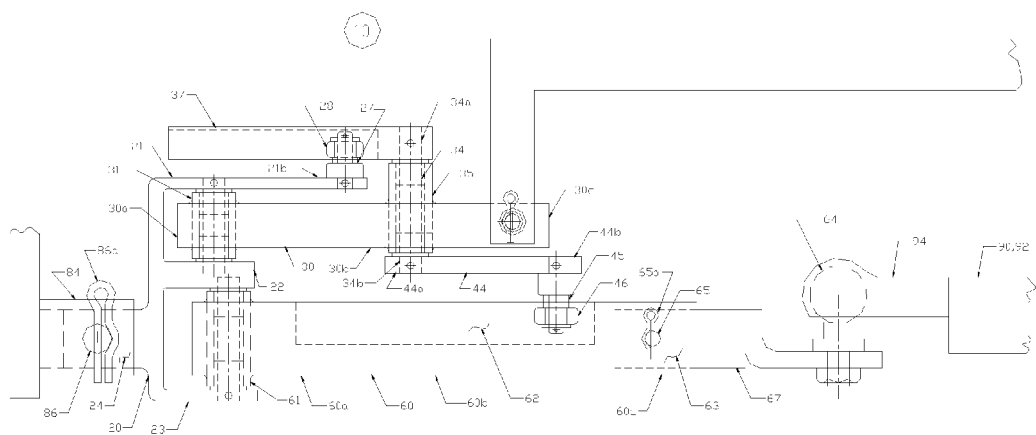
FIG. 4 is an enlarged side view of the trailer hitch according to the present invention.

Referring to FIG. 3 and FIG. 4, hitch frame 20 forward end includes a hitch tongue 24, and hitch frame rearward end includes an upper member 21 having a rearward end 21b, a middle member 22, and a lower member 23.

Hitch tongue 24 inserts into a hitch bar receptacle 84 existing on rearward end of towing vehicle 80. A removable pin 86 inserts through a hole on receptacle 84 and a hole on hitch tongue 24 to keep hitch tongue 24 inside receptacle 84. A spring pin 86a inserts through a hole on pin 86 to keep pin 86 in place.

An upwardly extending roller 28 has a pivotal connection with the upper member 21 rearward end 21b by a pivotal connection 27.

Hitch beam 60 middle portion 60b has a slot 62, and rearward end has a cavity 63.

Center beam 30 middle portion includes a vertically-positioned center shaft 34 in pivotal connection with center beam 30 by a pivotal connection 35. Center shaft 34 includes an upper end 34a and a lower end 34b that upper end 34a affixing a slot 37 extending forwardly that roller 28 on upper member 21 interposing inside slot 37.

An arm 44 has a forward end 44a and a rearward end 44b that forward end 44a affixes on center shaft lower end 34b. A downwardly extending roller 46 is in pivotal connection with arm 44 rearward end 44b by a pivotal connection 45. Roller 46 interposes inside slot 62 on hitch beam 60.

A hitch bar 67 having a forward end and a rearward end that forward end fits inside cavity 63 on hitch beam rearward end 60c. A pin 65 inserts through a hole on cavity 63 and a hole on hitch bar 67 of keeping hitch bar 67 in place, and a spring pin 65a inserts through a hole on pin 65 to keep pin 65 in place. Hitch bar 67 rearward end affixes to a hitch ball 64.

Trailer hitch coupler 94 on forward end of the trailer 90 engages hitch ball 64 on hitch beam 60.

Figure 5:
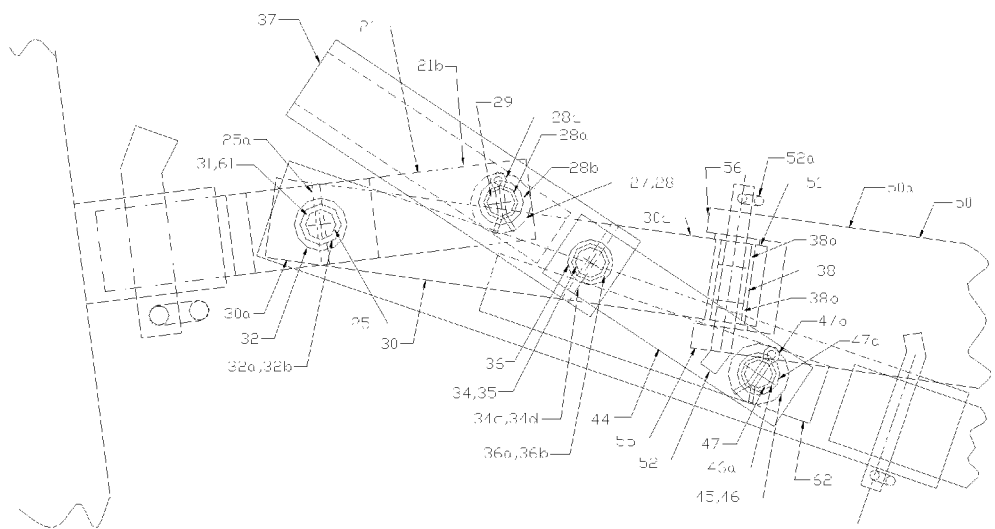
FIG. 5 is an enlarged plan view of the trailer hitch showing components details according to the present invention.
Figure 6:
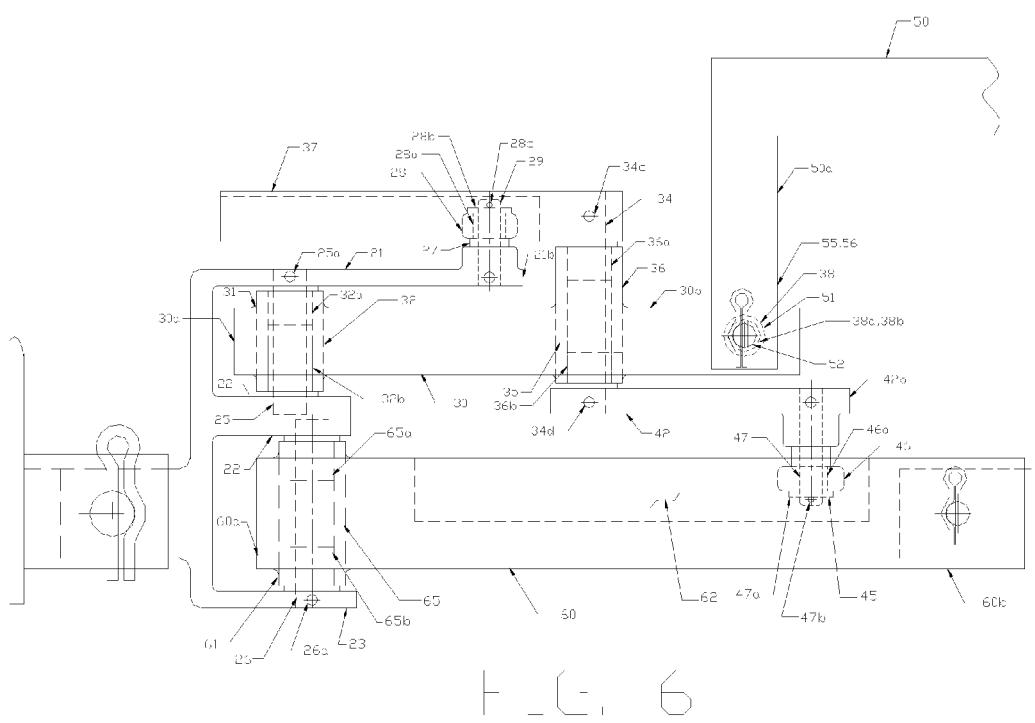
FIG. 6 is an enlarged side view of the trailer hitch showing components details according to the present invention.

Referring to FIG. 5 and FIG. 6, roller 28 pivotal connection 27 includes an upwardly extending pin 29 affixing on upper member 21 rearward-end 21b. Roller 28 is able to rotate on pin 29 through a bearing 28a interposed between the upper surface of member 21 and the lower end of roller 28. A washer 28b is inserted onto pin 27 and a spring pin 28c is inserting through a hole on pin 29 to keep roller 28 in place.

Center beam 30 forward end pivotal connection 31 includes a vertical positioned sleeve 32 extending through and affixed firmly to center beam forward end 30a. Two bearings in the form of flange bushings 32a and 32b fit tightly inside sleeve 32 at the top and bottom. Upper bearing 32a is against upper member 21 and lower bearing 32b is against middle member 22. A pin 25 inserts through a hole on upper member 21, bushing 32a, bushing 32b and a hole on middle member 22. A spring pin 25a inserts through a hole on upper member 21 and a hole on pin 25 to keep pin 25 in place. Sleeve 32 allows center beam 30 to swing in an arc horizontally around pin 25.

Center shaft 34 pivotal connection 35 includes a vertically-positioning sleeve 36 extending through and affixed firmly to center beam 30. Two bearings in the form of flange bushings 36a and 36b fit tightly into sleeve 36 at the top and bottom. Center shaft 34 is inserting through slot 38, bushings 36a, 36b and arm 44 with upper bushing 36a against slot 38 lower surface and lower bushing 36b against arm 44 upper surface. A pin 34c is inserted through slot 38 and center shaft 34, and a pin 34d is inserted through arm 44 and center shaft of securing slot and arm to center shaft. Center shaft 34 is able to rotate vertically inside sleeve 36.

Roller 46 pivotal connection 45 with arm 44 includes a downwardly extending pin 47 affixed on arm 44 rearward end 44b. Roller 46 is able to rotate on pin 47 through a bearing 46a in the form of a flange bushing inserted through roller 46. A washer 47a is placed onto pin 47, and a spring pin 47b is placed through a hole on pin 47 to keep washer 47a and roller 46 in place. Roller 46 is interposed inside slot 62 on hitch beam 60.

Pivotal connection 51 on center beam rearward end 30c includes a horizontally-positioned sleeve 38 extending through and affixed firmly to center beam 30. Two bearings in the form of flange bushings 38a and 38b fit tightly into sleeve 38 ends.

Pivotal connection 51, on center beam-extension 50 forward end 50a, includes a left fork 55 and a right fork 56 such that each fork has a hole, and center beam 30 rearward end 30c fits between the left fork and the right fork. A removable pin 52 is placed through the hole on left fork 55, bushing 38b, bushing 38a and right fork 56, and a spring pin 52a is placed through a hole on pin 52 to keep pin 52 in place. Sleeve 38 allows center beam-extension 50 to swing in an arc vertically around pin 52.

Hitch beam 60 forward-end pivotal connection 61 (not shown in FIG. 5) includes a vertical positioning sleeve 65 extending through and affixed firmly on hitch beam forward end 60a. Two bearings in the form of flange bushings 65a and 65b are tightly fit into sleeve 65 at the top and bottom. Upper bushing 65a is against middle member 22 and lower bushing 65b is against lower member 23. A pin 26 inserts through the hole on lower member 23, bushing 65b, bushing 65a and middle member 22. A spring pin 26a inserts through a hole on lower member 23 and a hole on pin 26 of keeping pin 26 in place. Sleeve 65 allows hitch beam 60 to swing in an arc horizontally around pin 26.

As shown, pivotal connections 31 and 61 are not coincidental, but pivotal connections 31 and 61 can be coincidental such that pin 25 and pin 26 can be coincidental and can become one single pin.

Refer back to FIG. 1, FIG. 2, FIG. 3 and FIG. 4 for illustrating the functions of the present invention. As shown, the towing vehicle is making a slight left turn causing the towing vehicle rearward end and hitch frame upper member 21 attaching roller 28 and roller-engaging slot 37 displacing to the right, which rotates center shaft 34 clockwise and displaces arm 44, affixing roller 46, roller-engaging slot 62, hitch beam 60 and attached hitch ball 64 to the left, and displaces hitch ball-engaging hitch coupler 94 on trailer forward end to the left. As a result, when the towing vehicle is turning to the left slightly, the towed vehicle forward end is shifting to the left too.

In the above description, it is to be noted that because center beam 30 and center beam extension 50 are connected together by pivotal connection 51, which is flexible vertically but is rigid laterally, center beam 30 and center beam extension 50 together are treated as one solid beam in the lateral direction which is the longest member in the hitch assembly. Therefore, the mid-portion of this member where center shaft 34 is affixed has less lateral movement than that of the roller 28 affixed on the hitch assembly when the towing vehicle is turning. The difference in lateral movement between roller 28 and center shaft 34 is thus able to turn the center shaft and create the subsequent movements of other components and at the end to produce lateral movement of hitch ball 64.

The hitch ball 64 lateral movement shifting amount depends on the hitch assembly construction mainly depending on its component lengths being made, such that for a fixed amount of the towing vehicle forward end lateral shifting but with different component lengths, the resultant hitch ball 64 lateral displacement will be different.

When the towing vehicle makes small turn such as a lane change, in the case when the resultant hitch ball 64 lateral displacement amount is the same as the towing vehicle rearward end lateral displacement amount but opposite in direction, such that the two displacements cancel out each other, the hitch ball 64 and engaging trailer hitch coupler remain at the same location as that before the towing vehicle was turning. As a result, the towed vehicle forward end moving direction and moving momentum is not changed nor affected by the towing vehicle forward end lateral shifting, and thus the towed vehicle remains steady and does not swing.

In the case with the hitch assembly components made such that when the lateral shifting amount of hitch ball 64 and coupling hitch coupler 94 is more than the towing vehicle rearward end shifting amount but opposite in direction, hitch ball 64 and coupling hitch coupler 94 will shift to the direction as the towing vehicle forward end shifting direction.

In this case, the towed vehicle forward end is equivalent to a pivot at a point, which is the intersection of the towed vehicle center line extension and the towing vehicle center line, and is forward of the towing vehicle rear axle.

Because the pivot point is forward of the towing vehicle rear axle, when the towing vehicle turns, the towed vehicle moving momentum follows the towing vehicle forward end turning direction, and shifts to the same direction as the towing vehicle turning direction, such that when the vehicles are reducing speed, especially in a down hill situation, the towed vehicle momentum and weight are pushing toward a point forward of the towing vehicle rear axle in the towing vehicle mid-section rather than the towing vehicle rear-end, thus having less chance for pushing the towing vehicle rearward end off the road and creating a "jack Knife" situation.

During ordinary operations of the vehicles, due to road conditions being uneven and moving vehicle direction changes, with hitch coupler 94 engaging hitch ball 64 as the main connection and controlling the distance between the two vehicles, and the other connection between the two vehicles being the connection of center beam 30 and center beam-extension 50 between pivotal connection 31 and pivotal connection 53, the distance between the two vehicles is constantly changing, and the changing distance is compensated by the center beam-extension mid portion 50b sliding mechanism, while the elevation differences between the two vehicles is compensated by pivotal connections 51 and 53.

Also to be noted is that pivot joint 35 on center beam 30 keeps center shaft 34 vertical in center beam 30, so that slot 37 and arm 44 are maintained horizontally parallel to center beam 30. As upper member 21, middle member 22, lower member 23, center beam 30 and hitch beam 60 are all horizontally parallel, roller 28 is able to stay in slot 37, and roller 46 is able to stay inside slot 62 at all times.

Figure 7:
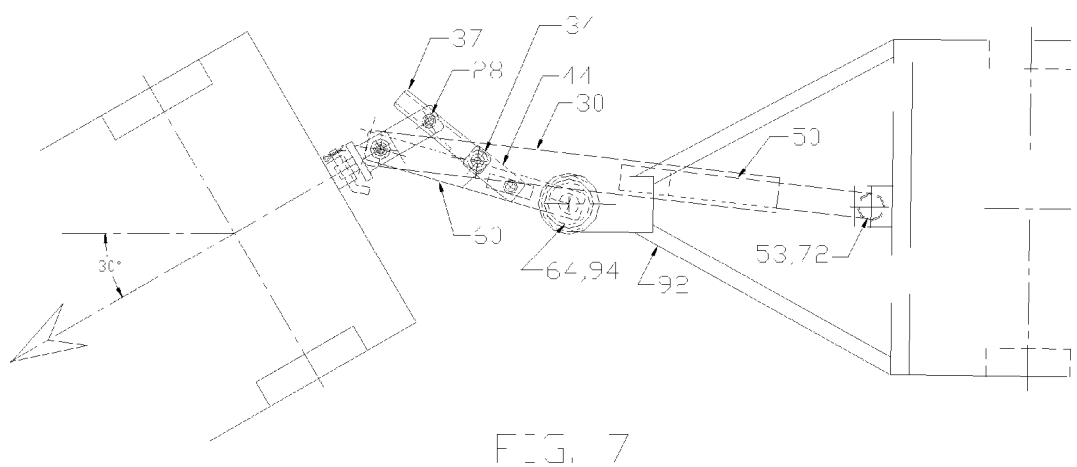
FIG. 7 is a plan view of the trailer hitch showing the vehicles are making a bigger turn.

As shown in FIG. 7, when the towing vehicle is making a bigger turn, as roller 28 displaces more, the angle forming between upper member 21 and slot 37 reduces and becomes closer to 90 degrees. The effective displacement of roller 28 against slot 37 is reducing, and an increasing roller 28 lateral movement produces a proportionally lesser angular movement of slot 37. Thus, the towed vehicle forward end does not proportionately displace laterally with the towing vehicle-turning angle.

As a result, the hitch assembly is most effective when the towing and towed vehicles are moving in a path closer to a straight line. One example is in the case when vehicles are moving on highways and have a higher speed such that a small degree of turning of the towing vehicle creates a large lateral movement of the towed forward end to make the towed vehicle forward end follow the towing vehicle turning direction. On the other hand, when the towing vehicle makes a big turn normally at lower speed, the towed vehicle forward end does not over-shift laterally, thus avoiding the case of forcing the towed vehicle forward end toward a non-ideal path.

Figure 8:
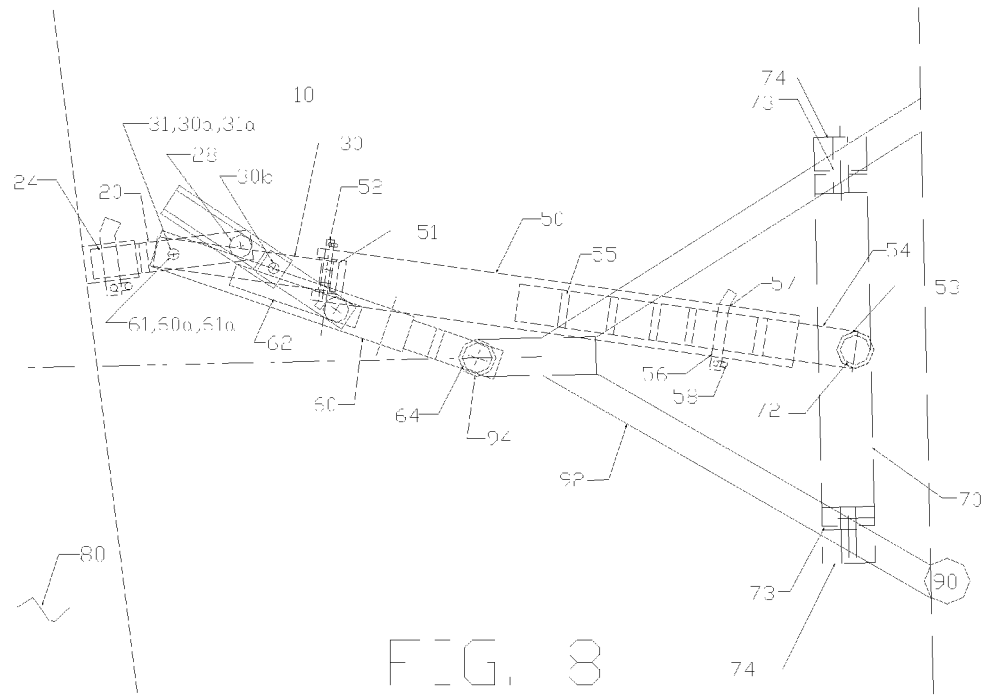
FIG. 8 is a plan view of the trailer hitch according to another embodiment of the present invention of connecting a towed vehicle in the form of a trailer to a towing vehicle.
Figure 9:
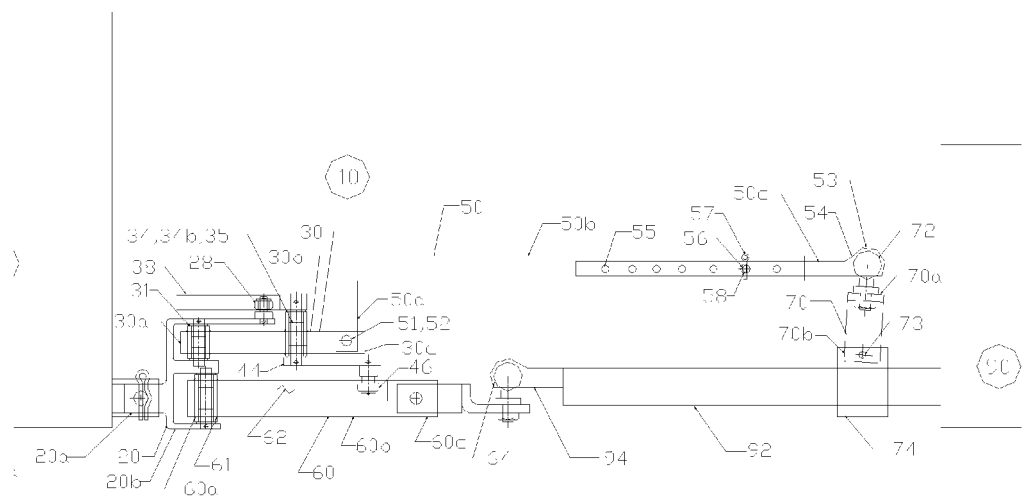
FIG. 9 is a side view of the trailer hitch according to another embodiment of the present invention of connecting a towed vehicle in the form of a trailer to a towing vehicle.
Figure 10:
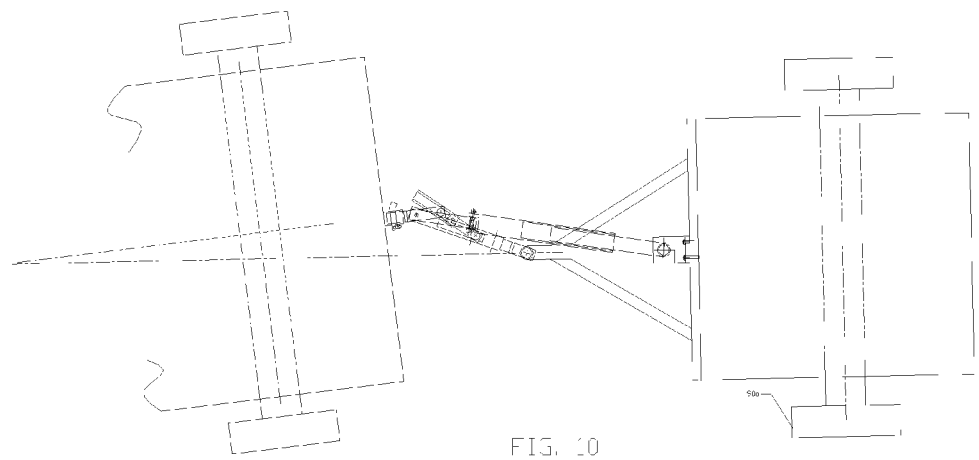
FIG. 10 is a plan view of the trailer hitch according to the present invention of connecting the trailer to the towing vehicle without individual components indication numbers.

Referring to FIG. 8 and FIG. 9, according to another embodiment of the present invention, the center beam-extension 50 includes a center section 50b, which is hollow inside, such that a center beam-extension rear section 50c is able to slide inside center section 50b. Center section 50b includes a through-hole 56 going through both walls, and rear section 50c includes a plurality of holes 55 such that a pin 57 is placed through hole 56 and one of the holes 55, and a spring pin 58 is placed through a hole in pin 57 to keep pin 57 in place.

Rear section 50c rearward end affixing a hitch coupler 54 connects to a rear support 70 upper end 70a affixing hitch ball 72, and rear support 70 lower end 70b is pivotally connected to the towed vehicle frame 92 by a pair of pivotal connection 73 connecting to a pair of brackets 74 affixed to the towed vehicle frame 92, such that rear support 70 is able to swing fore and aft around pivotal connection 73. In this structure, the swinging fore and aft of the rear support 70 compensates the changing distance between the towing vehicle and the towed vehicle when vehicles are moving, and pluralities of holes 55 on center beam-extension rear section 50c allows different hole 55 to be used to align with hole 56 on center beam-extension mid-section 50b for pin 57 to push through, such that center beam-extension lengths can be adjusted to suit for different towed vehicles to be towed.

Figure 11:
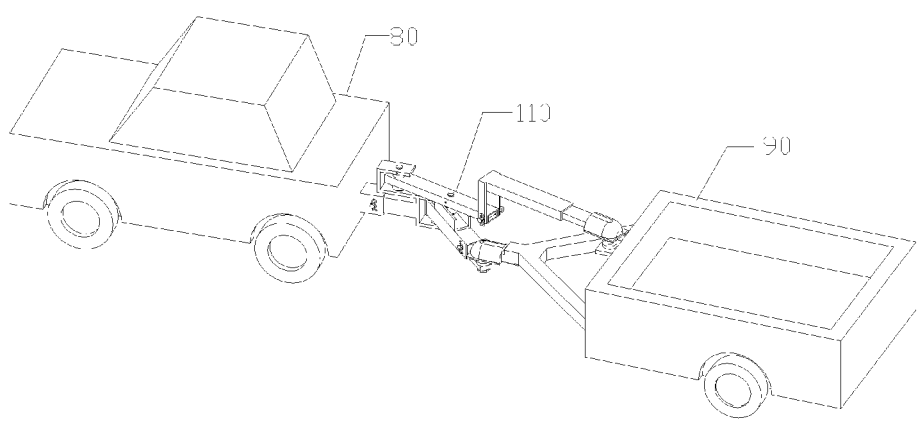
FIG. 11 is a prospective view of the trailer hitch assembly, according to the second embodiment of the present invention, connecting a towed vehicle in the form of a trailer to a towing vehicle.

Refer to FIG. 11, according to another embodiment of the present invention, a hitch assembly of the present invention is generally designated by reference numeral 110 and articulately connects a towing vehicle 80 and a towed vehicle 90.

Figure 12:
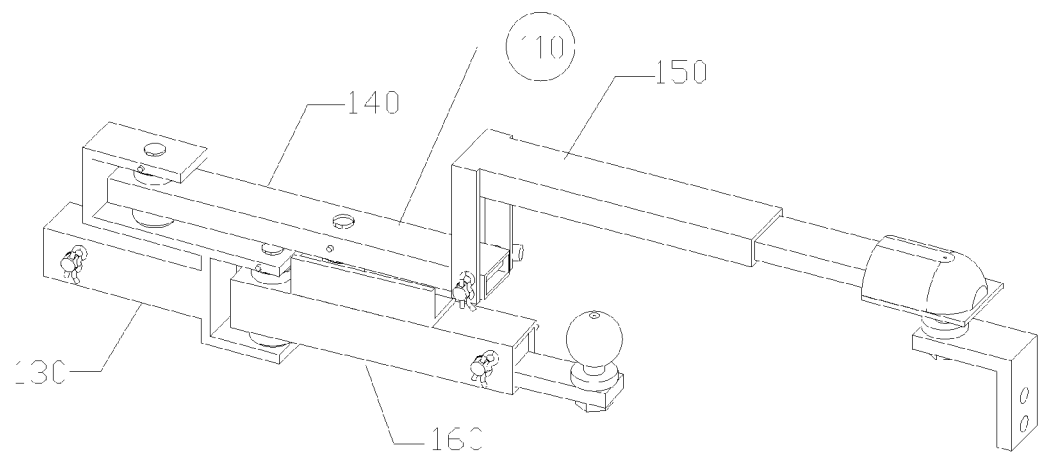
FIG. 12 is a prospective view of the trailer hitch assembly according to the second embodiment of the present invention.

FIG. 12 shows hitch assembly 110 including: a hitch frame assembly 130, a center beam assembly 140, a center beam extension assembly 150, and a hitch beam assembly 160.

Figure 13:
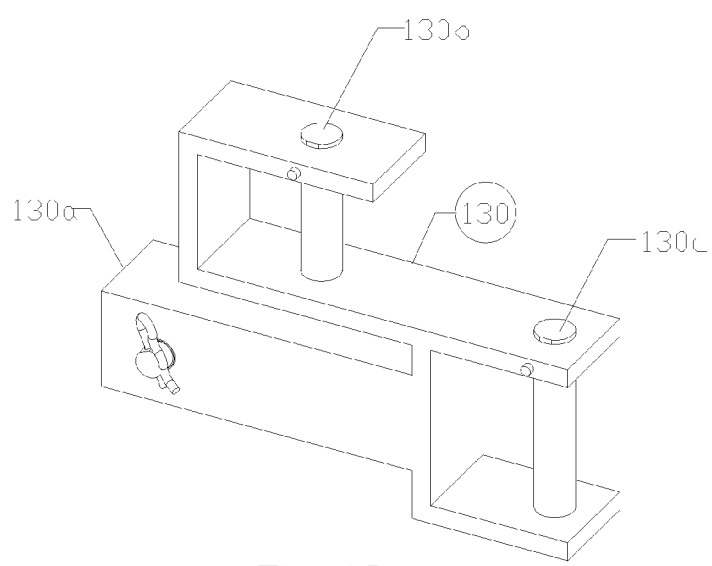
FIG. 13 is a prospective view of the trailer hitch's frame assembly according to the second embodiment of the present invention.

FIG. 13 shows frame assembly 130 having a forward end 130a, pivot point 130b and pivot point 130c.

Figure 13A:
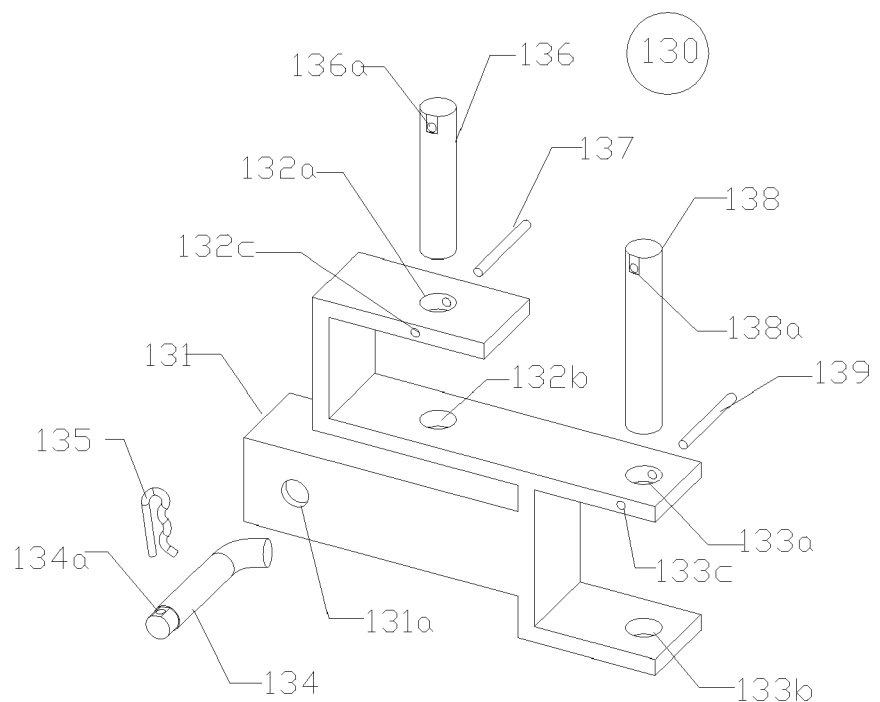
FIG. 13A is a prospective view of the frame assembly components according to the second embodiment of the present invention.

FIG. 13A shows frame assembly 130 components including; a frame body 131 having holes 131a, 132a, 132b, 132c, 133a, 133b, and 133c, a pin 134 having a hole 134a, a spring pin 135, a pin 136 having a hole 136a, a pin 137, a pin 138 having a hole 138a, and a pin 139.

When frame assembly 130 components are assembled, pin 134 is placed into hole 131a, and spring pin 135 is placed into hole 134a to keep pin 134 therein, pin 136 is placed into holes 132a and 132b, and pin 137 is placed into holes 132c and 136a to keep pin 136 therein, pin 138 is placed into holes 133a and 133b, and pin 139 is placed into holes 133c and 138a to keep pin 138 therein.

Figure 13B:
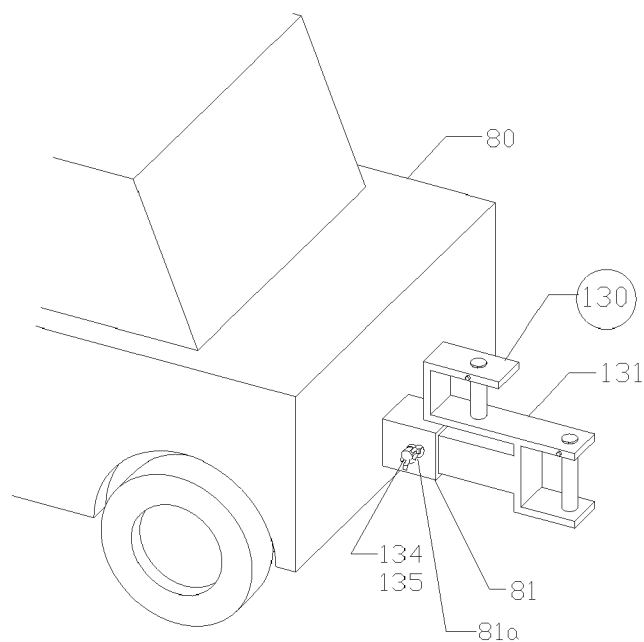
FIG. 13B is a prospective view of the frame assembly installed on to the rearward end of the towing vehicle according to the second embodiment of the present invention.

FIG. 13B shows the rearward end of towing vehicle 80 having a hitch receptacle 81 having a hole 81a, and hitch frame assembly 130 is placed into hitch receptacle 81, and pin 134 is placed through hole 81a on hitch receptacle 81 and the hole on hitch frame body 131, and spring pin 135 is placed through the hole on pin 134 to keep pin 134 in place.

Figure 14:
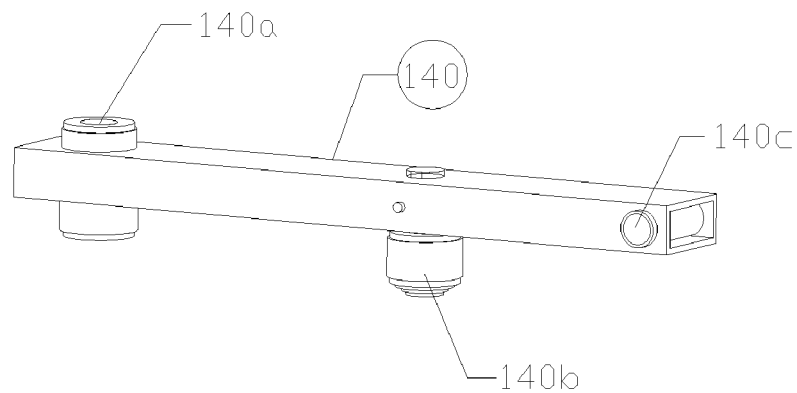
FIG. 14 is a prospective view of the trailer hitch's center beam assembly according to the second embodiment of the present invention.

FIG. 14 shows center beam assembly 140 having a forward end having a pivot point 140a, a mid portion having a pivot point 140b, and a rearward end having a pivot point 140c.

Figure 14A:
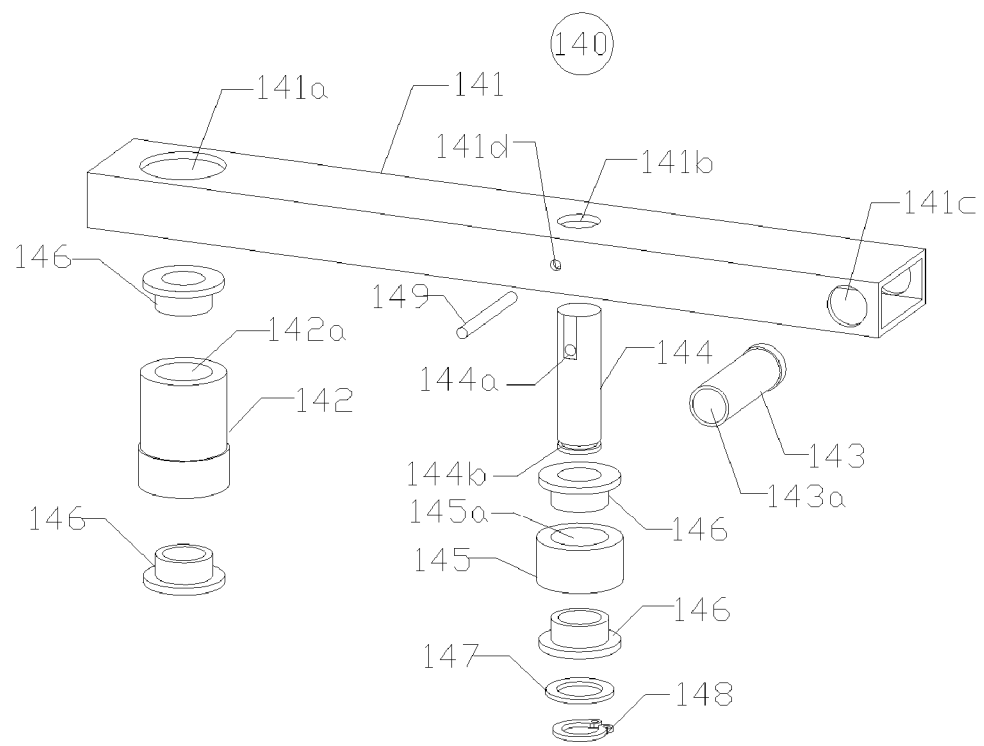
FIG. 14A is a prospective of the center beam assembly components according to the second embodiment of the present invention.

FIG. 14A shows center beam 140 components including: a center beam body 141 having holes 141a, 141b, 141c and 141d, a sleeve 142 having a hole 142a, a sleeve 143 having a hole 143a, a pin 144 having a hole 144a and a groove 144b, a roller 145 having a hole 145a, four of bearings in the form of bushings 146, a washer 147, and a shaft spring clip 148.

When center beam 140 components are assembled; sleeve 142 is placed into hole 141a and affixed firmly thereto, two of bearings 146 are placed on the ends of hole 142a and affixed firmly thereto, sleeve 143 is placed into hole 141c and affixed firmly thereto, pin 144 is placed into hole 141b, and pin 149 is placed into hole 141d and hole 144a to keep pin 144 firmly affixed to center beam 141, two of bearings 146 are placed on the ends of hole 145a and affixed firmly thereto, roller 145 and washer 147 are placed onto pin 144, and shaft spring clip 148 is placed onto groove 144b to keep roller 145 and washer 147 on pin 144.

Figure 14B:
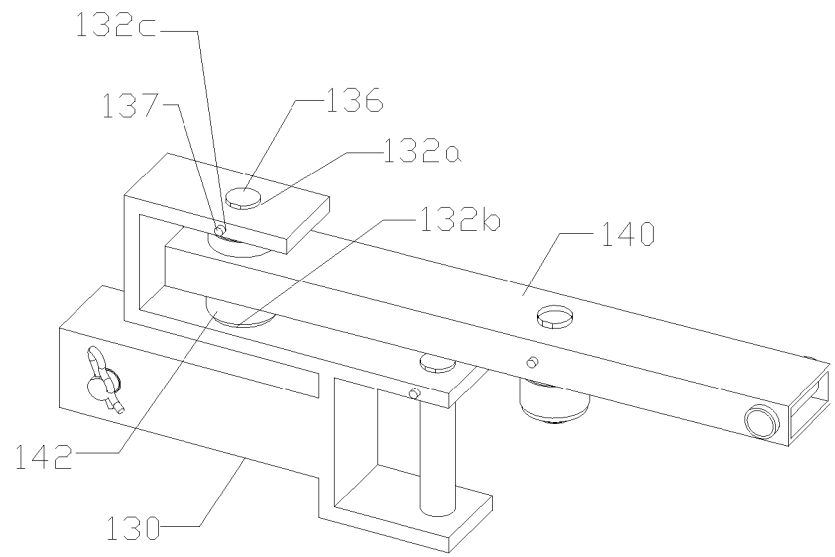
FIG. 14B is a prospective view of the center beam assembly installed onto the frame assembly according to the second embodiment of the present invention.

FIG. 14B shows center beam assembly 140 installed onto hitch frame assembly 130. Pin 136 is placed through hole 132a, sleeve 142 and hole 132b, and pin 137 is placed through holes 132c and hole on pin 136 to keep pin 136 in place. Center beam assembly 140 is able to rotate laterally around pin 136.

Figure 15:
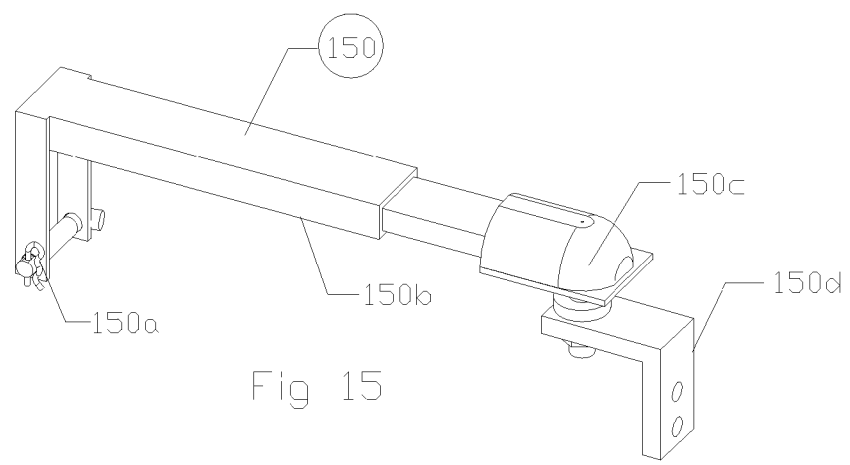
FIG. 15 is a prospective view of the trailer hitch's center beam extension assembly according to the second embodiment of the present invention.

FIG. 15 shows center beam extension 150 having a forward end having a pivot point 150a, a mid portion 150b, and a rearward portion 150c.

Figure 15A:
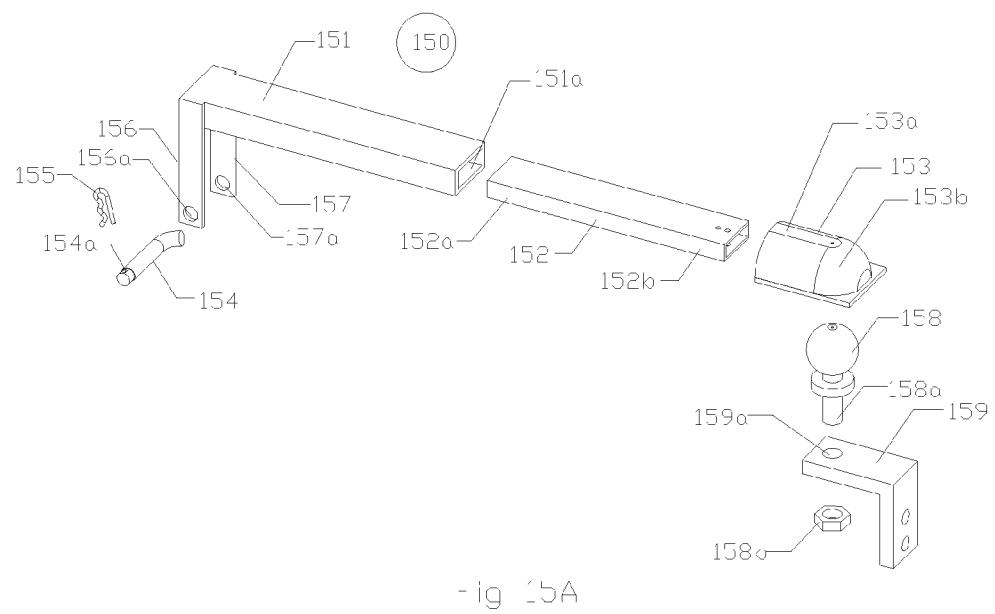
FIG. 15A is a prospective view of the center beam extension assembly components according to the second embodiment of the present invention.

FIG. 15A shows center beam extension 150 components including: a front-section 151 having a forward end having a left prong 156 having a hole 156a and a right prong 157 having a hole 157a, and a rearward end having a rectangular hole 151a, a mid-section 152 having a forward end 152a having a rectangular shape, a rearward end 152b, a rear-section having a ball receptacle 153 having a forward end 153a and a rearward end 153b having a ball shape cavity, a pin 154 having a hole 154a, a spring pin 155, a hitch ball 158 having a threaded end 158a, a bracket 159 having a hole 159a, and a nut 158b.

When center beam extension 150 components are assembled; mid-section 152 forward end 152a is placed and slidably inside front-section 151 rearward end 151a, mid-section 152 rearward end 152b is firmly affixed to ball receptacle 153 forward end 153a, pin 154 is placed through holes 157a and 156a, spring pin 155 is placed through hole 154a to keep pin 154 in place, hitch ball 158 threaded end 158a is placed through hole 159a on bracket 159, nut 158b is placed on threaded end 158a to keep hitch ball 158 attached to bracket 159, and hitch ball 158 is removably attached to ball receptacle 153.

Figure 15B:
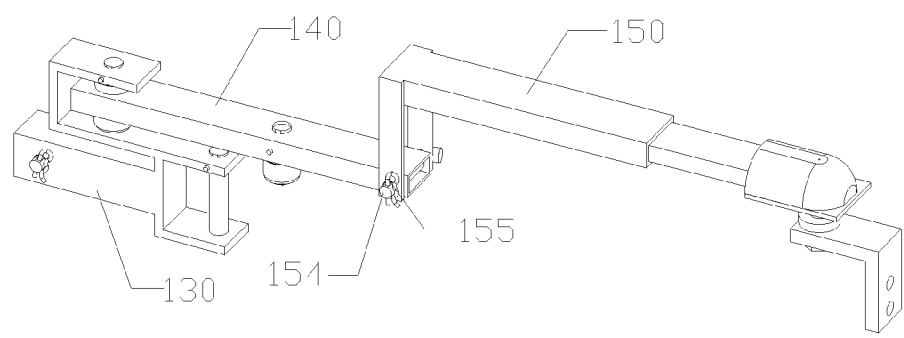
FIG. 15B is a prospective view of the center beam extension assembly installed onto the center beam assembly and the frame assembly according to the second embodiment of the present invention.

FIG. 15B shows center beam extension 150 installed onto center beam 140, such that pin 154 is placed through holes on prongs on center beam extension 150 forward end and the hole on center beam 140 rearward end, and spring pin 155 is placed through the hole on pin 154 to keep pin 154 therein. Center beam extension 150 is able to rotate around pin 154 vertically.

Figure 16:
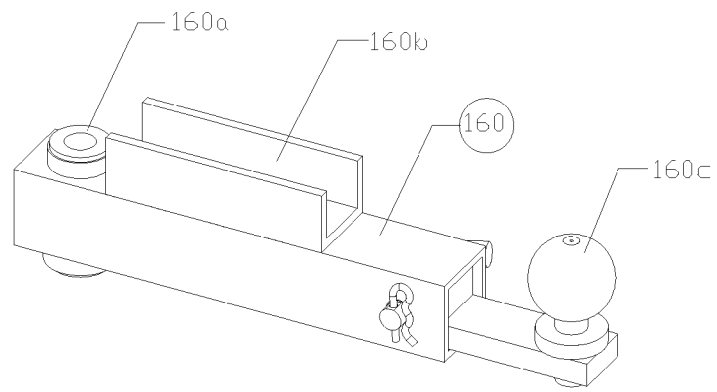
FIG. 16 is a prospective view of the trailer hitch's hitch beam assembly according to the second embodiment of the present invention.

FIG. 16 shows hitch beam assembly 160 having a forward end having a pivot point 160a, a mid portion having a slot 160b, and a rearward end having a pivot point 160c.

Figure 16A:
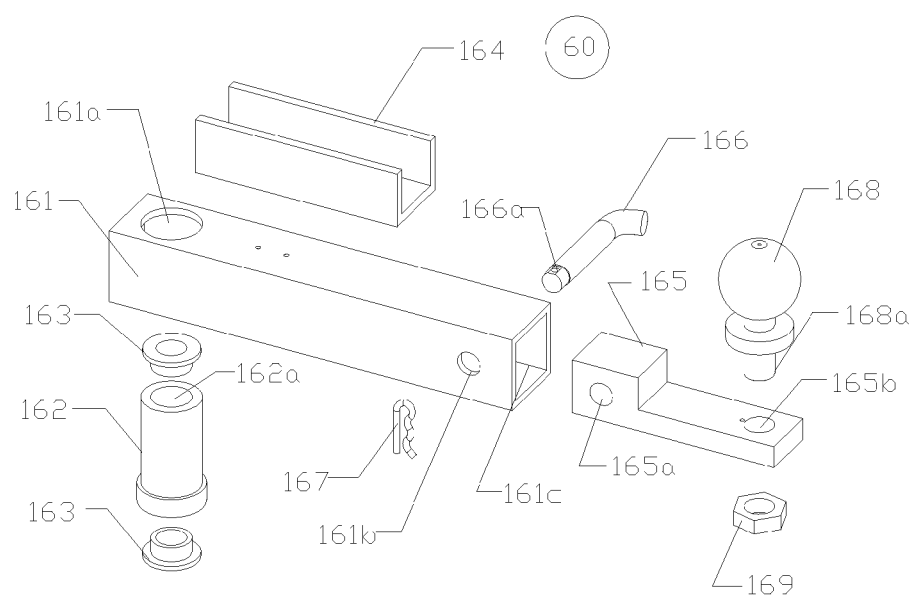
FIG. 16A is a prospective view of the hitch beam assembly components according to the second embodiment of the present invention.

FIG. 16A shows hitch beam 160 components including: a body 161 having holes 161a, 161b, and 161c, a sleeve 162 having a hole 162a, two of bearings in the form of flange bushings 163, a slot 164, a block 165 having holes 165a and 165b, a pin 166 having a hole 166a, a spring pin 167, a hitch ball 168 having an threaded end 168a, and a nut 169.

When hitch beam 160 components are assembled; sleeve 162 is placed into hole 161a and affixed firmly thereto, two of bearings 163 are placed into the ends of hole 162a and affixed firmly thereto, slot 164 is firmly affixed to hitch beam body 161, block 165 forward end is placed inside hole 161c, and pin 166 is placed through holes 161b and 165a, and spring pin 167 is placed through hole 166a to keep pin 166 in place, hitch ball threaded end 168a is placed though hole 165b, and nut 169 is placed onto threaded end 168a to secure hitch ball 168 firmly to block 165.

Figure 16B:
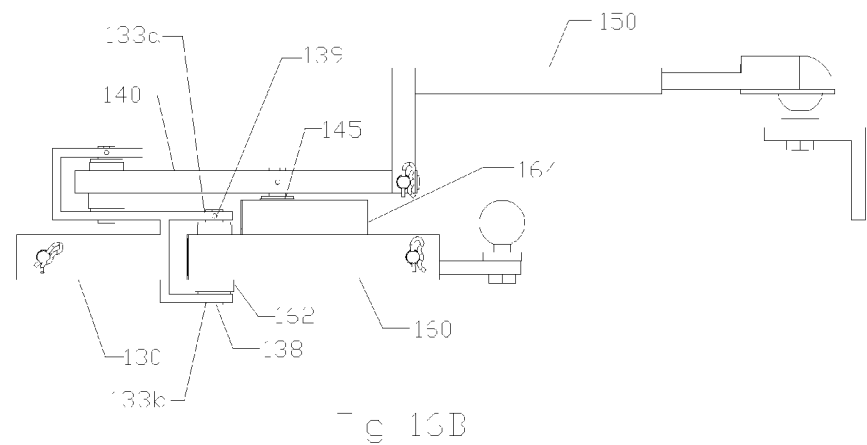
FIG. 16B is a front view of the hitch beam assembly installed onto the frame assembly according to the second embodiment of the present invention.

FIG. 16B shows hitch beam assembly 160 installed onto hitch frame assembly 130. Slot 164 on hitch beam 160 is aligned with roller 145 on center beam 140, such that roller 145 is positioned inside and slidably engaged with slot 164, sleeve 162 is aligned with holes 133b, pin 138 is placed through hole 133b, sleeve 162, and hole 133a, and pin 139 is placed through a hole on frame assembly 130 and a hole on pin 138 to keep pin 138 in place. Hitch beam 160 is able to rotate around pin 138 laterally.

Figure 17:
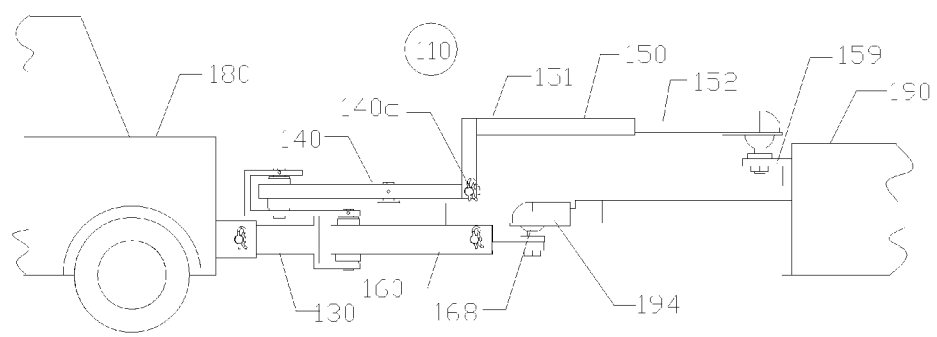
FIG. 17 is a front view of the trailer hitch assembly connecting a towed vehicle in the form of a trailer to a towing vehicle according to the second embodiment of the present invention.

FIG. 17 shows hitch assembly 110 installed between towing vehicle 180 and trailer 190, such that hitch frame assembly 130 forward end installed onto towing vehicle 180 rearward end as was shown in FIG. 13B, hitch beam 160 rearward end hitch ball 168 is coupled to trailer 190 forward end coupler 194, and center beam extension 150 rearward end bracket 159 is firmly affixed to trailer 190 body.

When towing vehicle 180 and trailer 190 are moving, due to road conditions and vehicles turning, the elevations and distances between the vehicles are constantly changing. Pivot point 140c allows center beam extension 150 rearward end 159 to follow trailer 190 elevations to compensate for the differences in elevations, while the sliding engagement between center beam extension body 151 and body 152 compensates for the varying distances between the vehicles.

Figure 17A:
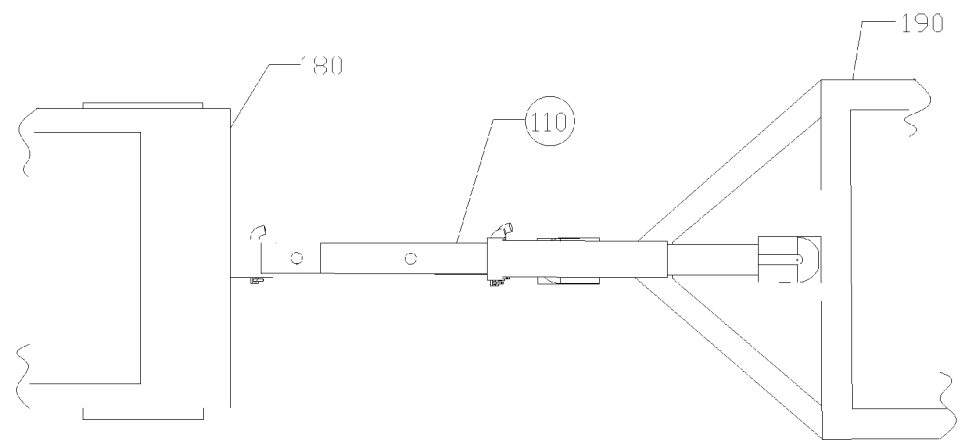
FIG. 17A is a front view of the trailer hitch assembly connecting a trailer to a towing vehicle, with the trailer is in a straight line with the towing vehicle, according to the second embodiment of the present invention.

FIG. 17A shows when towing vehicle 180 and trailer 190 are in a straight path, such that trailer hitch assembly 110 is functioning as a regular trailer hitch.

Figure 17B:
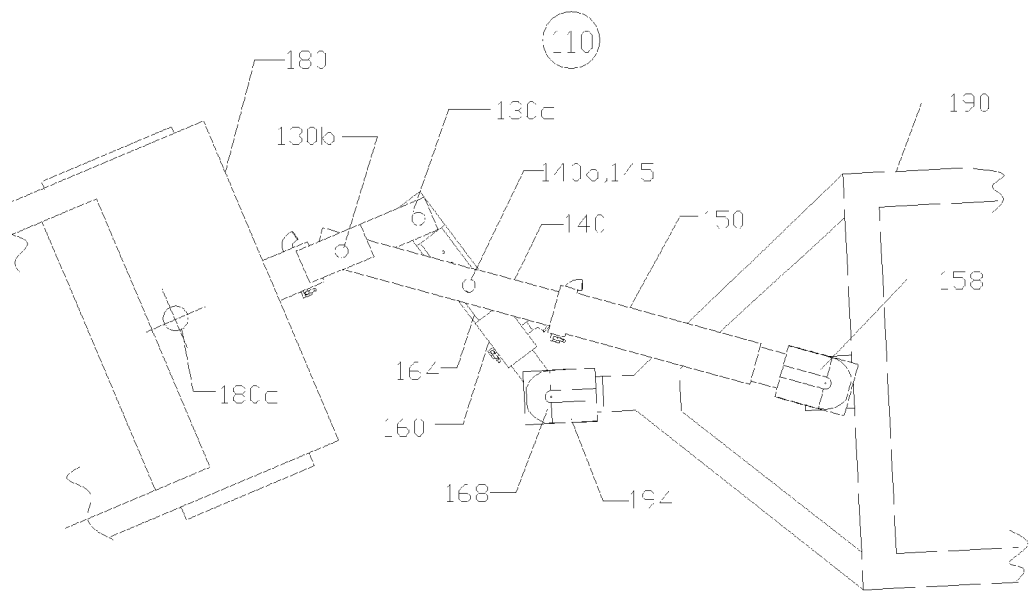
FIG. 17B is a top view of the trailer hitch assembly connecting a trailer to a towing vehicle, with the trailer is at an angle with the towing vehicle, according to the second embodiment of the present invention.

FIG. 17B shows towing vehicle 180 has turned to the left at an angle and pivoted around vehicle rear axle center 180c. Since pivot point 130c is further away from axle center 18c than pivot point 130b, pivot point 130c has displaced more lateral movement than pivot point 130b. Center beam 140 connected to center beam extension 150 has formed the longest member in hitch assembly 110, such that with this longest member forward end is pivoting at pivot point 130b and rearward end is pivoting at coupler 158, such that pivot point 140b on center beam 140 where roller 146 (also was shown on FIG. 14) is attached has less lateral displacement than pivot point 130c. Since roller 146 is positioned inside slot 164, lateral displacement differences between pivot point 130c and pivot point 140b causes slot 164 to slide against and to turn around roller 146, such that hitch beam 160 rearward end hitch ball 168 and coupled hitch ball socket 194 on trailer 190 forward end displaces laterally toward the direction that towing vehicle 180 is turning, such that trailer 190 has less tendencies to sway.

What is claimed is:

1. An anti-sway trailer hitch assembly for articulately connecting a towing vehicle to a towed vehicle, comprising:

A hitch frame having a forward end for connection to said towing vehicle rearward end, a rearward end having a first pivot point having a vertical first axis, a second pivot point having a vertical second axis, said first pivot point located forwardly of said second pivot point, A center beam having a forward end having a first pivot point having a vertical first axis in pivotal connection to said hitch frame first pivot point by a connection, said connection allowing said first axis to coincide with said first axis on said hitch frame and allowing said center beam to swing laterally around said first axis on said hitch frame, a central portion having a second pivot point having a vertical second axis, a rearward end having a third pivot point having a horizontal third axis, A hitch beam having a forward end having a first pivot point having a vertical first axis in pivotal connection to said hitch frame second pivot point by a connection, said connection allowing said first axis to coincide with said second axis on said hitch frame and allowing said hitch beam to swing laterally around said second axis on said hitch frame, a central portion having a slot, said second axis on said center beam positioned inside said slot and slide-ably engaged with said slot, a rearward end having a second pivot point, Said towed vehicle having a first pivot point in pivotal connection to said second pivot point on said hitch beam rearward end by a connection, a second pivot point, said second pivot point located rearward of said first pivot point, A center beam-extension having a forward end having a first pivot point having a horizontal first axis in pivotal connection to said third pivot point on center beam rearward end by a pivotal connection, said connection allowing said first axis to coincide with said third axis on said center beam and allowing said center beam-extension to swing vertically around said third axis on said center beam, a rearward end having a second pivot point in pivotal connection to said second pivot point on said towed vehicle by a connection.

2. The hitch assembly of claim 1, wherein said pivotal connection at forward end of said towed vehicle is a removable connection allowing said towed vehicle to be removed from said hitch beam.

3. The hitch assembly of claim 1, wherein said pivotal connection between said center beam-extension and said center beam is a removable connection allowing said center beam-extension to be removed from said center beam.

4. The hitch assembly of claim 1, wherein said pivotal connection between said second pivot point on said center beam extension and said second pivot point on said towed vehicle is a removable connection allowing said center beam-extension to be removed from said towed vehicle.

5. The hitch assembly of claim 1, wherein said center beam-extension connected to said center beam together between said first pivot point on said center beam forward end and said second pivot point on said center beam-extension rearward end having a variable distance in longitudinal direction and remaining rigid in latitudinal direction.

* * * * *